May 16, 1961  E. P. ANDERSON ET AL  2,984,108
SIGHT GAUGE
Filed Jan. 22, 1957
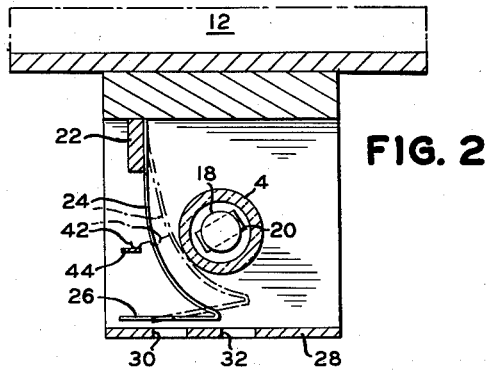
FIG. 2
FIG. 3
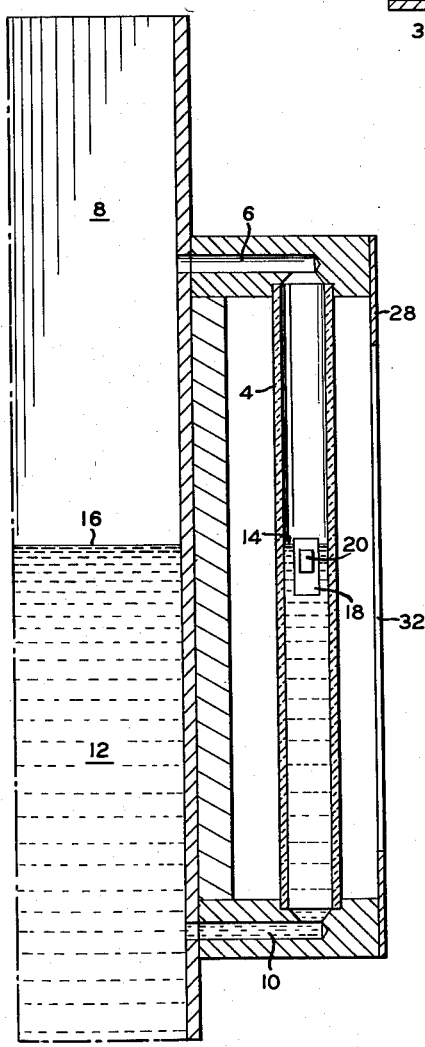
FIG. 1
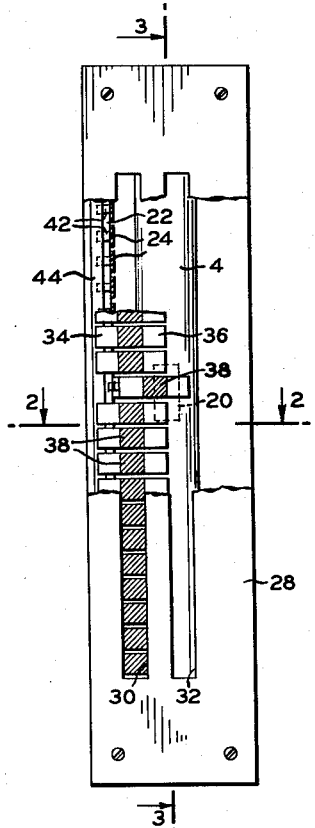
INVENTORS
EDWARD P. ANDERSON
DONALD H. FISH
BY
Karl Huber
James E. Bryan
ATTORNEYS United States Patent Office 2,984,108
Patented May 16, 1961

2,984,108

SIGHT GAUGE

Edward P. Anderson, Livingston, and Donald H. Fish, Clifton, N.J., assignors, by mesne assignments, to Engelhard Industries, Inc., Newark, N.J., a corporation of Delaware Filed Jan. 22, 1957, Ser. No. 635,264

3 Claims. (Cl. 73—323)

This invention relates to a sight gauge, particularly a sight gauge used to indicate the liquid level in a tank.

Liquid level sight gauges are commonly known which consist of a glass tube mounted in comunication with an enclosed liquid in a tank or the like; these gauges are in common use on stationary boilers. However, after these gauges have been in use for some time, the deposition of salts, and other matter from the water, on the interior of the sight glass renders the reading of such gauges difficult if not impossible in some cases.

In U.S. Patent No. 2,934,953 issued May 3, 1960, there is disclosed a sight gauge particularly adapted for use in determining the liquid level in a tank or the like, and in this device the chamber of the sight gauge is surrounded by a concentric tube which encloses another body of fluid. In one embodiment of the invention, a slave float is slidably mounted in the annular space between the sight glass chamber and the outer tube, and is responsive to the position of a magnet mounted on the float within the sight glass chamber due to the fact that the slave float is made of magnetic material. Other embodiments of such sight gauges are also disclosed in the above mentioned U.S. Patent.

In accordance with the present invention, a novel type of sight gauge is provided which has many advantages over those disclosed in the above-identified U.S. Patent. In this invention there is no concentric tube provided around the sight gauge chamber and the invention is therefore much simpler to construct and is also novel in concept. The invention includes an elongated sight glass chamber, which may be made of glass or other non-magnetic material, the elongated chamber being in communication at the lower end thereof with the liquid phase in a steam boiler or the like; the upper end of the gauge being in communication with the vapor space above the liquid level in the boiler.

The sight gauge chamber is surrounded by an enclosure which may be of any shape, but is desirably rectangular, and in front of the enclosure there is provided one or more slots, preferably two slots, for reading the position of a float within the sight glass, the float having a magnet mounted thereon. Positioned adjacent to the sight glass is a series of spring steel reeds which have two different colored markings on the front thereof, so that they present a uniform color when viewed through the slots in the front plate of the device. However, as the magnet on the float in the chamber moves up and down within the chamber, in response to variations in the liquid level in the boiler or the like, the reeds will be displaced toward the magnet, thereby presenting a different color on the front of the reed to the slot on the front plate and thereby facilitating a reading of the liquid level, since it is unnecessary to see the position of the float within the elongated chamber.

Other applications of the invention to similar float measuring or indicating devices will be apparent to those skilled in the art.

Referring to the accompanying drawings in which one embodiment of the device of the present invention is shown:

Figure 1 is a front view, partially broken away and partially in section, showing one embodiment of the sight gauge of the invention, Figure 2 is a sectional view taken on line 2—2 of Figure 1, and Figure 3 is a sectional view taken on line 3—3 of Figure 1.

The device comprises an elongated chamber 4, preferably made of glass or the like, which is in communication at its upper end by means of the tube 6 with the vapor space 8 in a steam boiler or the like.

The chamber 4 communicates at the lower end thereof by means of the tube 10 with a body of liquid 12, such as the water in a steam boiler, thus the level 14 of the liquid in the chamber 4 corresponds with the level 16 of the liquid in the boiler. A float 18 is slidably mounted in the chamber 4 and will move up and down in the chamber in response to variations in the liquid level therein; the float 18 has the magnet 20 mounted thereon. Mounted adjacent to the chamber 4 is a vertical supporting strip 22 and affixed to the vertical supporting strip are a plurality of spring steel reeds 24. These reeds have a bent-over portion 26 at the free ends thereof which is substantially parallel to the front plate 28 of the sight gauge.

The front plate 28 of the sight gauge is provided with a pair of vertical slots 30 and 32 and these slots are so arranged, in conjunction with the bent-over portions of the reeds 26, that a continuous color is presented through each slot, except for that reed which is positioned adjacent to the magnet on the float 18. The bent-over portions of the reeds 26 are painted in two different colors and, as best seen in Figure 1, the bent-over portions may have, for example, two white panels 34 and 36 with a black panel 38 interposed therebetween. Thus, ordinarily the sight gauge presents one continuous black color in the vertical slot 30. However, the reed adjacent to the magnet on the float is displaced to the right, as best seen in Figure 1, and when this occurs, two white panels are present in the two vertical slots 30 and 32 and the position of the float will be readily apparent to one viewing the sight gauge. If desired, the reeds may be provided with one contact of an electrical switch 42, as shown in Figure 2, the other contact 44 being mounted in a stationary fashion so that movement of the reeds will open and close an electrical circuit, thereby energizing indicating equipment such as a buzzer, bell or the like.

It will be obvious to those skilled in the art that many modifications may be made within the scope of the present invention without departing from the spirit thereof, and the invention includes all such modifications.

What we claim is:

1. A sight gauge comprising an elongated chamber, a float located within said chamber for movement in response to the fluid level in the chamber, a permanent magnet mounted on said float, means providing a pair of vertically extending viewing slots adjacent said chamber, a plurality of thin, flat magnetic springs each mounted at one end for movement toward said chamber in response to the proximity of said magent, each of said springs having its free end portion bent to a position generally parallel both to the direction of movement of said spring and to the plane of said viewing slots and located adjacent at least one of said viewing slots, and means distinctively marking the end portions of said springs on the side toward said slots to clearly indicate movement of said springs with respect to said slots.

2. A sight gauge comprising a chamber, magnetic means within the chamber responsive to variation in liquid level in the chamber, at least one thin resilient magnetic member mounted at one side of said chamber and extending along a curved path along and partially around said chamber to move toward and away from said chamber, the free end of said magnetic member being bent in a direction opposite the curvature of the magnetic member to present a surface generally parallel to the direction of movement of the magnetic member, and registration means located close to said surface for providing a visual reference for determining movement of said magnetic member.

3. A sight gauge comprising a chamber, magnetic means within the chamber responsive to variation in liquid level in the chamber, at least one thin resilient magnetic member mounted at one side of said chamber and extending along a curved path along and partially around said chamber to move toward and away from said chamber, the free end of said magnetic member being bent in a direction opposite the curvature of the magnetic member to present a surface generally parallel to the direction of movement of the magnetic member, registration means located close to said surface for providing a visual reference for determining movement of said magnetic member, and a moving contact mounted on the side of said resilient member away from said chamber, and a mating contact mounted for engagement with said moving contact.

References Cited in the file of this patent

UNITED STATES PATENTS

| | | |
|---|---|---|
| 1,040,127 | Bonnesteel | Oct. 1, 1912 |
| 1,350,345 | Tanner | Aug. 24, 1920 |
| 1,491,487 | Means | Apr. 22, 1924 |
| 2,339,922 | Gatewood | Jan. 25, 1944 |

FOREIGN PATENTS

| | | |
|---|---|---|
| 130,171 | Austria | Nov. 10, 1932 |